United States Patent [19]
Ammann

[11] 3,896,210
[45] July 22, 1975

[54] METHOD FOR RECOVERING MOLYBDENUM FROM PARTICULATE SILICATE SLAGS

[75] Inventor: Paul R. Ammann, Boxford, Mass.

[73] Assignee: Kennecott Copper Corporation, New York, N.Y.

[22] Filed: June 25, 1973

[21] Appl. No.: 372,983

Related U.S. Application Data

[63] Continuation-in-part of Ser. No. 316,570, Dec. 19, 1972, abandoned, which is a continuation of Ser. No. 78,777, Oct. 7, 1970, abandoned.

[52] U.S. Cl. .............. 423/56; 423/55; 423/57; 423/58; 423/61; 423/593; 423/606; 75/109; 75/401 BE
[51] Int. Cl. ............................................ C01g 39/00
[58] Field of Search ............ 75/101 R, 101 BE, 121, 75/108, 109; 423/53, 54, 57, 61, 56, 58

[56] References Cited
UNITED STATES PATENTS

| | | | |
|---|---|---|---|
| 1,278,408 | 10/1918 | Westling | 75/133.5 |
| 1,514,972 | 11/1924 | Kissock | 423/61 |
| 1,583,053 | 5/1926 | Kjellberg | 423/592 |
| 2,096,846 | 10/1937 | Donahue et al. | 423/596 |
| 3,083,085 | 3/1963 | Lewis et al. | 423/54 |
| 3,314,783 | 4/1967 | Zimmerley et al. | 423/30 |
| 3,429,693 | 2/1969 | Bauer et al. | 75/121 |
| 3,455,677 | 7/1969 | Litz | 75/109 |
| 3,510,273 | 5/1970 | Fitzhugh et al. | 423/11 |
| 3,576,595 | 4/1971 | Chiola et al. | 423/54 |

*Primary Examiner*—Herbert T. Carter
*Attorney, Agent, or Firm*—John L. Sniado; Lowell H. McCarter; Anthony M. Lorusso

[57] ABSTRACT

Particulate ferrosilicate slags which contain oxides of metals such as calcium, magnesium and aluminum are treated to extract molybdenum values therefrom. The treatment includes oxidation of the slag at a temperature between 800°–1100°C. As a result of oxidation, the solid particulate slag separates into two phases. One phase contains iron oxide and the other phase is a silicate phase containing oxides of such elements as calcium, magnesium and aluminum. During treatment, the molybdenum is oxidized to its highest state and complexes with the alkali and alkaline earth metals in the silicate phase to form molybdates. The oxidized particulate slag is leached to selectively remove the molybdenum. The molybdenum is recovered from the leach liquor.

17 Claims, 1 Drawing Figure

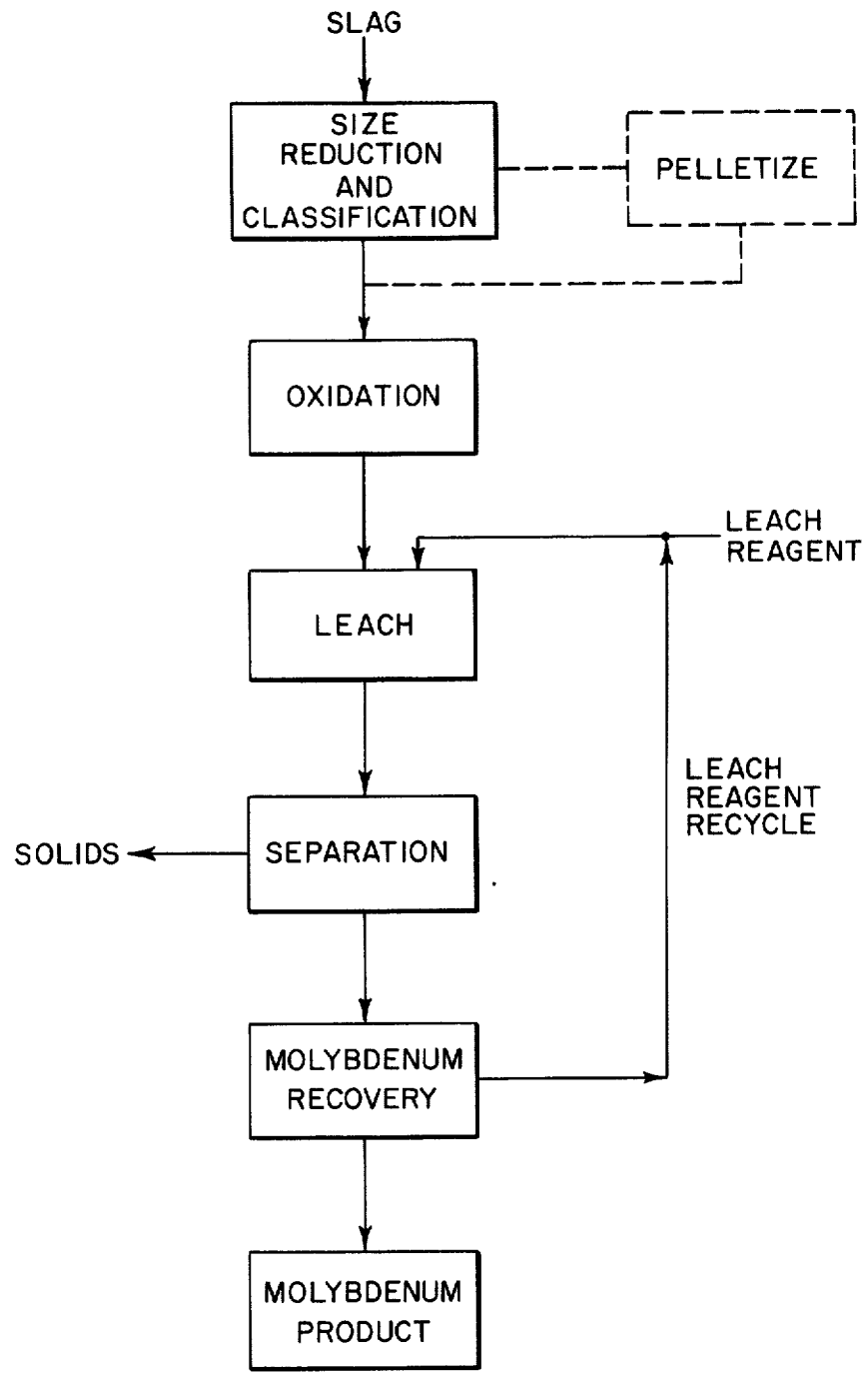

METHOD FOR RECOVERING MOLYBDENUM FROM PARTICULATE SILICATE SLAGS

CROSS REFERENCE TO RELATED APPLICATIONS

This application is a continuation-in-part of application Ser. No. 316,570 filed Dec. 19, 1972, entitled "Method for Recovering Molybdenum from Copper Reverberatory Slags," which is a continuation of application Ser. No. 78,777 filed Oct. 7, 1970, entitled "Method for Recovering Molybdenum from Copper Reverberatory Slag," both now abandoned.

BACKGROUND OF THE INVENTION

This invention relates to a method for recovering molybdenum from copper smelter slags, particularly copper reverberatory furnace slags.

Slag obtained from the reverberatory smelting of copper concentrate may contain a sufficiently high molybdenum concentration to provide an economic incentive for its recovery. However, typical leaching processes cannot be used to recover and isolate the molybdenum in these slags because the iron silicate is inert to dilute acids and caustic solutions. Concentrated caustics and acids dissolve the slag but with an uneconomical consumption of the reagent used. Thus, if leaching is to be used in order to recover iron silicate from slags, it is desirable to convert the iron silicate phase to a form that permits selective molybdenum extraction either with an acid or caustic leaching solution.

Generally, the molybdenum present in the slag is due to inefficiencies in the flotation step for separating molybdenite from copper sulfide minerals prior to the smelting step. Analysis of typical copper reverberatory slags shows that the molybdenum is dispersed throughout the glassy iron silicate phase. Other copper slags such as copper converter slags also contain molybdenum bound in an iron silicate phase although at concentrations lower than those in copper reverberatory slags. While the present invention is particularly adapted for use with copper reverberatory slag because of its relatively high molybdenum content, it is to be understood that other slags such as steel slags or copper smelter slags containing molybdenum in an iron silicate phase also can be processed according to this invention.

It has been proposed to recover molybdenum from copper reverberatory slags by a process that includes a leaching step whereby molten slag is first treated in a reducing atmosphere to reduce the molybdenum in preference to the iron oxide therein. The molybdate value is then recovered from the reduced slag by a two-step leaching process comprising treatment with an acid first and then extraction of the molybdates from the acid residue with a caustic. The leaching process must be conducted under carefully controlled conditions to maintain the molybdenum in a trivalent state so that it can be precipitated as a trihydroxide. This process is undesirable due to the need for stringent process controls during the precipitation step and because of the heat requirements needed to maintain the slag in the molten state during reduction. This process is also undesirable because it requires two separate leaching steps.

SUMMARY OF THE INVENTION

An economical method for recovering molybdenum from ferrosilicate slags is provided by the present invention which includes comminuting the slag to produce a particulate slag and oxidizing the particulate ferrosilicate slag to separate the molybdenum values from the iron. The molybdenum is oxidized during treatment and combines with various non-ferrous metal oxides in a silicate phase within the solid slag particles from which it can be economically selectively recovered after a leaching step by any one of many known procedures.

Accordingly, it is an object of the present invention to provide a method for recovering molybdenum from slags in which the slag is converted to form which permits selective leaching of the molybdenum values.

A further object of the present invention is to provide an economical and novel method for recovering molybdenum from slags such as copper reverberatory slags which includes a leaching step.

Yet another object of the present invention is to provide a method for extracting molybedenum values from ferrosilicate slags which has lower heat requirements than known prior art processes for recovering molybdenum from such slags.

It is a further object of the present invention to provide a method for recovering molybdenum from ferrosilicate slags in which only one leaching step is required to selectively dissolve the molybdenum values.

BRIEF DESCRIPTION OF THE DRAWING

The sole FIGURE of the drawing is a flow diagram illustrating the method of the present invention.

DESCRIPTION OF THE PREFERRED EMBODIMENTS

At the outset, the process of the present invention is described in its broadest overall aspects with a more detailed description following.

In the method of the present invention slags are treated to place the molybdenum values in a leachable form so that they can be selectively leached from the slag. To treat the slag, it is first oxidized in an exothermic reaction to convert the iron silicate into a ferric oxide phase and silica phase. Coincident with this conversion, the molybdenum in the slag is oxdized to its highest state and complexes with the calcium, magnesium or sodium that are normally present in the slags to form molybdates such as calcium molybdate in the silicate phase. The oxidized slag is then contacted with either an acid or a caustic reagent to selectively dissolve the molybdenum values within the silicate phase of the slag. The molybdenum is recovered from the leaching solution by conventional means, such as ion exchange.

The slag is introduced in the oxidation step as relatively small particles. It has been found that the particle size affects the degree of oxidation for a given set of oxidation conditions and that this in turn can affected the degree of recovery of molybdenum by affect leaching. Generally, the smaller the particle size the more complete the oxidation for a given set of oxidation conditions. Particles as large as about 1 inch in diameter can be deoxidized, however, in order to obtain relatively complete oxidation of the slag at moderate temperatures and times, the average particle size of the slags should preferably be less than 20 mesh, more preferably between about 90 and 325 mesh. The particulate slag is oxidized in any convenient furnace such as a muffle furnace or rotary kiln furnace. Oxidation temperatures are maintained to obtain relatively complete oxidation of the slag without excessive molybdenum vaporization. Suitable temperaure conditions that may be employed are from 800° to 1200°C, preferably from 1000° to 1100°C and for periods of up to about three hours.

It is well known in this art that ferrosilicates decompose when heated in air as shown by equations (1) and (2) below:

$$2FeO \cdot SiO_2 + \tfrac{1}{2} O_2 \rightarrow Fe_2O_3 + SiO_2 \quad (1)$$
$$2FeO \cdot SiO_2 + \tfrac{1}{3} O_2 \rightarrow \tfrac{2}{3} Fe_3O_4 + SiO_2 \quad (2)$$

Indeed, U.S. Patent No. 1,583,053 to Kjellberg entitled "Method of Recovering Vanadium Compounds from Iron Ores Containing Vanadium and Titanium" utilizes the iron silicate decomposition reaction to separate vanadium from iron ores. At this point, however, it should be noted that there has never been any suggestion in the prior art that molybdenum values in ferrosilicate slags would separate from the iron oxides upon oxidation and remain in the silicate phase. In this regard, an important step in the present invention is oxidation of the slag to convert or separate the slag into two phases, an iron phase and a silicate phase with the molybdenum values complexing with various metal-bearing materials normally present in the slags being treated to from stable molybdates that remain in the silicate phase from which they can be easily leached.

At this point, it should be noted that the slag separation which occurs when particulate ferrosilicate slags are oxidized is a microscopic separation. At the oxidizing temperature employed in the present method (800°C–1100°C), slag is solid. When heated at a temperature between 800°C to its melting point (about 1250°C), the slag burns. During burning or oxidation, the slag undergoes separation into two phases while it is solid. The significance of this separation is that the molybdenum is easily selectively leached from the cooled slag when separated from the iron.

During oxidation, the iron silicate (fayalite) is converted to ferric oxide, ferrous oxide and cristobolite ($SiO_2$). The molybdenum is released from the iron silicate phase and also is oxidized. Molybdenum is converted to its highest oxidation state and reacts to form thermally stable compounds such as calcium molybdate. Other stable compounds that may be formed include, but are not limited to, the sodium molybdates, magnesium molybdates and other alkali and alkaline earth metal molybdates. The formation of calcium molybdate during the present method has been confirmed by electron microprobe analysis. These thermally stable molybdenum compounds can be selectively leached from the iron oxides and the silica.

The oxidized molybdenum, particularly calcium molybdate, is solubilized with either caustic or acid solutions (greater than 0.1Normal) and either type of reagent can be employed for selective leaching. Suitable useful acids and acid salts are those that react with the oxidized molybdenum to form water-soluble molybdate salts such as sulfuric acid, sodium sulfate, potassium sulfate, and potassium acid sulfate. When employing an acid, the pH should be maintained less than 3, preferably less than 1, to effect reasonably complete leaching. When employing an acid salt, the acid ion concentration should be greater than 0.1N, preferably greater than 0.5. It is preferred to employ sulfuric acid. While iron oxide also reacts with sulfuric acid, the reaction rate is much slower than the reaction rate of calcium molybdate and sulfuric acid. Thus, sulfuric acid leaching is relatively selective for molybdenum.

Suitable caustic reagents include bases or basic salts which react with calcium molybdate to form water soluble molybdate salts such as sodium hydroxide, potassium hydroxide, sodium carbonate, sodium bicarbonate, potassium carbonate, ammonium carbonate, or ammonium bicarbonate or mixtures thereof. When employing hydroxide, the leach solution pH should be greater than 12, preferably greater than 13. When employing a basic salt, the basic metal ion concentration should be greater than 0.1N, preferably greater than 0.5N.

Acid leaching is preferred to caustic leaching since it proceeds at a faster rate, is more selective, and is more economical. Greater molybdenum recovery can be obtained with caustic leaching; however, it is less selective than acid leaching since caustic dissolves silica as well as molybdates. Generally, molybdenum recovery of up to about 50 percent can be obtained with sodium hydroxide in about six days, but a great amount of NaOH is consumed in reactions with silica. The leaching step is conducted at elevated temperatures, but preferably within a temperature range from about 30°C to about 60°C.

The molybdenum rich solution obtained from the leaching step is treated by any convention means to recover molybdenum. Suitable treatments include solvent extraction, ion exchange, precipitation with ferric or cacium molybdate, or cementation with metallic iron to form precipitated molybdenum oxides. One particularly suitable treatment involves extraction of molybdenum from either the acidic or basic solution with an amine such as ethylenediaminetetra-acetic acid. The molybdenum chelate formed after contact with the acid is contacted with ammonium hydroxide to form ammonium molybdate in solution which is recovered. Alternatively, the molybdenum can be recovered by precipitation. The molybdenum leach solution is acidified to a pH of from 2 to 4 and contacted with particulate metallic iron. The molybdenum is reduced by the iron particles and precipitates. The precipitate is reoxidized to form molybdenum oxide and is reacted with ammonia to form ammonium molybdate. Other conventional means for separating molbdenum from the molybdenum-rich leach solution are equally suitable.

The significant aspects of the chemistry of the present method can be best understood by considering the composition of typical reverberatory furnace slags. Typical reverberatory furnace slags have the following major components:

| Item | Concentration (wt. %) |
|---|---|
| FeO | 38–51 |
| $SiO_2$ | 35–40 |
| $Al_2O_3$ | ~5 |
| CaO | 1–5 |
| MgO | 1–5 |
| Cu | ~0.5 |
| S | ~1 |
| Mo | 0.15–0.5 |

In the liquid or molten state, the slag is chemically homogenous, with the exception of some copper-iron sulfide which may be entrained in the liquid. If the slag is cooled rapidly, such as by water granulation, the slag retains a homogeneous state, but if it is cooled slowly, at least two distinct solid phases may form (a calcium silicate phase and a ferrous silicate phase). Although the chemistry of the homogenous slag is difficult to describe, the following compounds are considered to exist:

| | |
|---|---|
| $2FeO \cdot SiO_2$ | ferrosilicate or fayalite |
| $Al_2O_3 \cdot SiO_2$ | alumino silicate |
| $CaO \cdot SiO_2$ | calcium silicate |
| $CaO \cdot Al_2O_3$ | calcium aluminate |
| $MgO \cdot SiO_2$ | magnesium silicate |
| $MgO \cdot Al_2O_3$ | magnesium aluminate |
| $Fe_3O_4$ | magnetite |

It should be noted that above the melting point of the slag, these compounds are soluble in one another. Because of the oxidation state of the slag, as determined by the FeO and $Fe_3O_4$, it is assumed that the molybdenum is present in a reduced state [$Mo^{+4}$]. This conclusion is drawn on the basis of the following favorable reaction:

$$3FeO + [Mo^{+6}O_3] \rightarrow Fe_3O_4 + [_{Mo}^{+4}O_2] \quad (3)$$

The presence of $Mo^{+4}O_2$ in the slag cannot be proven analytically because of the very low concentrations of molybdenum in the slag while there are much larger concentrations of iron oxides in two oxidation states [$Fe^{+2}O$ and $Fe^{+3}O_3$] also present. In electron microprobe studies of granulated slags, it has been concluded that the molybdenum is uniformly dispersed throughout the homogenous silicate phase.

If the slag is heated in a neutral atmosphere (such as nitrogen or argon), and then cooled, the slag is basically unchanged. However, if the slag is heated above 800°C in air or in an oxidizing environment, the ferrosilicate structure is decomposed. The principle reactions, which are well known are:

$$2FeO \cdot SiO_2 + \tfrac{1}{2} O_2 \rightarrow Fe_2O_3 + SiO_2 \quad (1)$$
$$2FeO \cdot SiO_2 + \tfrac{1}{3} O_2 \rightarrow \tfrac{2}{3} Fe_3O_4 + SiO_2 \quad (2)$$

Since iron oxide and silica are the major constituents of slag, oxidation destroys the slag structure. Reactions (1) and (2) have been confirmed by electron diffraction analyses of oxidized slag which identified principle compounds of $Fe_3O_4$, $Fe_2O_3$ and α-cristobolite (α-$SiO_2$), but CaO, MgO and $Al_2O_3$ were unaccounted for. Although it is conjecture as to the behavior of the latter compounds, they should appear with the silica (and not the iron oxide) phase. Thus, two basic phases are expected in the completely oxidized slag:

I. $Fe_2O_3$, $Fe_3O_4$
II. $SiO_2$, $CaO \cdot SiO_2$, $MgO \cdot SiO_2$, $Al_2O_3 \cdot SiO_2$, $CaO \cdot Al_2O_3$, $MgO \cdot Al_2O_3$, etc.

These two phases have been confirmed by photomicrographs of oxidized slag.

As a result of oxidation of the slag, it is believed that the molybdenum is oxidized to its highest state in accordance with the following reaction:

$$[MoO_2]_{in\ slag}^{dissolved} + \tfrac{1}{2} O_2 \rightarrow MoO_3 (s) \quad (4)$$

Although applicant does not intend to be limited to a theory of operation, it is believed that $MoO_3$ reacts with calcium oxide or silicate or magnesium oxide or silicate to produce the corresponding molybdate in accordance with the following reactions:

$$CaO + MoO_3 \rightarrow CaMoO_4 \quad (5)$$
$$CaO \cdot SiO_2 + MoO_3 \rightarrow CaMoO_4 + SiO_2 \quad (6)$$
$$Mgo + MoO_3 \rightarrow MgMoO_4 \quad (7)$$
$$MgO \cdot SiO_2 + MoO_3 \rightarrow MgMoO_4 + SiO_2 \quad (8)$$

Although at present there is insufficient thermodynamic data to calculate whether these reactions take place at elevated temperatures, data at 25°C indicate that calcium and magnesium molybdates are very stable compounds. Furthermore, they are stable in air at 800° to 1100°C. Furthermore, using electron microprobe techniques to study oxidized slags, it has been concluded that:

(1) the molydenum is not present with the iron oxide phase;

(2) the molybdenum is associated with the "silicate" phase completely;

(3) grains of calcium molybdate are present in oxidized slag, always associated with or adjacent to the "silicate" phase.

Material balances made during the oxidation experiments showed that virtually no molybdenum "vaporized" from the slag during the oxidation.

On the basis of the available information, the following conclusions have been drawn.

1. Molybdenum is dissolved uniformly throughout reverberatory furance slags, presumably in a reduced chemical state [i.e., $Mo^{+4}$].

2. When the ferrosilicate (fayalite) slag is oxidized at 800° to 1100°C, the slag is decomposed into two phases: (a) iron oxides, and (b) "silicate" containing CaO, MgO, and $Al_2O_3$.

3. The molybdenum is oxidized to its highest state [$Mo^{+6}$].

4. The molybdenum oxide forms discrete grains of calcium molybdate and appears in the silicate phase.

5. The molybdenum oxide is not associated with the iron oxide phase.

The invention can be more fully described with reference to the sole FIGURE of the drawing which is a process flow diagram of this invention. Referring to the drawings, the slag from a coppper sulfide reverberatory furnace is directed to a size reducing step such as a milling step to comminute the slag and classify the particles. The particles then can be directed to a calcining-oxidation step or can be first pelletized by any suitable means prior to being directed to the oxidation step. The oxidized particulate slag then is directed to be a leaching step to be mixed with a leaching solution. The solution is separated from solids such as by decantation or by filtration and then is directed to a molybdenum recovery step to separate molybdenum from the caustic or acid. The molybdenum is then treated to obtain the product desired. The leaching solvent is recycled to the leaching step from the molybdenum recovery step.

The present invention is further illustrated by the following non-limiting example.

EXAMPLE I

Copper reverberatory slag was treated to recover molybdenum in the manner described below. The slag had the following composition, expressed as oxides:

| Table 1 | Wt. % |
|---|---|
| FeO | 45.00 |
| MgO | 1.50 |
| CaO | 3.50 |
| Mo | 0.30 |
| $SiO_2$ | 40.00 |
| $Al_2O_3$ | 5.00 |
| Cu | 0.50 |

The iron was present in the form of fayalite and the molybdenum was bound in the fayalite phase.

The slag was ball-milled to form particulate samples having different average particle size as follows:

Table II

| Sample No. | Average Particle Size-Mesh |
|---|---|
| 1 | 270–325 |
| 2 | 200–270 |
| 3 | 120–200 |
| 4 | 60–120 |

A portion of each sample was oxidized in a furnace with air for seven hours at varying temperatures to determine the effect of particle size and temperature on the extent of oxidation. The extent of oxidation was measured by percent weight gain. The results obtained after oxidation are shown in Table III. The sample numbers in Table III correspond to those of Table II.

Table III

| Sample No. | Oxidation Temperature, °C | Wt. % Gain |
|---|---|---|
| 1a | 800 | 6.40 |
| 1b | 900 | 6.35 |
| 1c | 1000 | 5.95 |
| 1d | 1100 | 5.20 |
| 2a | 800 | 5.90 |
| 2b | 900 | 6.55 |
| 2c | 1000 | 6.55 |
| 2d | 1100 | 6.00 |
| 3a | 800 | 5.35 |
| 3b | 900 | 6.35 |
| 3c | 1000 | 6.40 |
| 3d | 1100 | 5.65 |
| 4a | 800 | 3.55 |
| 4b | 900 | 5.25 |
| 4c | 1000 | 6.10 |
| 4d | 1100 | 4.95 |

As shown by Table III, the degree of slag oxidation tends to be particle size and temperature dependent, with maximum degree of oxidation generally occurring at the preferred temperature range of 1000° to 1100°C.

Samples 1d and 4d were leached with 1N sulfuric acid at 75°C for several days with constant stirring. The amount of molybdenum recovery is given below:

| Sample No. | Wt. % Mo Recovery |
|---|---|
| 1d | 45 |
| 4d | 42 |

Additional samples were also leached for 1 ½ hours at 65°C with sulfuric acid and sodium sulfate at concentrations ranging as follows:

Table IV

| Sample No. | Leach Solution H₂SO₄ | Na₂SO₄ | pH | Extraction wt. % Mo | Fe |
|---|---|---|---|---|---|
| 1d | 1N | 1N | 0.54 | 36 | 0.07 |
| 1d | 0.5N | 0.5N | 0.98 | 32.5 | 0.07 |
| 1d | 0.1N | 0.1N | 2.4 | 4.8 | 0.02 |

From the above, it is evident that molybdenum can be leached selectively from oxidized reverberatory slags.

The oxidized slag samples were leached with 1N sodium hydroxide at 75°C for varying times. The results are shown in Table V.

Table V

| Sample No. | Leaching Time Days | Extraction wt. % |
|---|---|---|
| 1d | 2 | 48 |
| 1d | 6 | 81 |
| 1d | 8 | 89 |
| 1d | 10 | 91 |
| 2c | 2 | 20 |
| 2c | 6 | 44 |
| 2c | 8 | 51 |
| 2c | 10 | 60 |
| 4c | 2 | 33 |
| 4c | 6 | 48 |
| 4c | 8 | 65 |
| 4c | 10 | 72 |

The results set forth in Table V show that oxidized slag can be leached with sodium hydroxide. However, sodium hydroxide also dissolves silica and the leaching is less selective than with acid.

When employing either acid or caustic reagents during the leaching step, molybdenum can be recovered by liquid-liquid extraction with a quarternary amine dissolved in kerosene which forms a chelate with the molybdenum ion. The chelate can then be reacted with ammonium to form ammonium molybdate which is a standard molybdenum product.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A method for recovering molybdenum from ferrosilicate slags containing iron, silica, molybdenum and other non-ferrous metals including a member from the group consisting of: the alkaline earth metals, calcium and magnesium; the alkali metal, sodium; and, mixtures thereof, comprising the steps of:

a. comminuting the slag to produce particulate slag;
   b. oxidizing the particulate slag at a temperature between the range of 800°C and 1200°C to convert the particulate ferrosilicate slag into particles containing an iron oxide phase and a silicate phase, the oxidation step also oxidizing the molybdenum in the slag to its highest oxidation state so that molybdenum complexes with the alkali and alkaline earth metals in the slag to form stable molybdates that remain with the silicate phase;
   c. selectively leaching the molybdenum from the oxidized slag of step (b) to form a molybdenum bearing leach solution; and
   recovering molybdenum from the leach solution of step (c).

2. The method as set forth in claim 1 wherein in step A the slag is reduced in size and classified so that it contains particles with sizes ranging between 20 and 325 mesh.

3. The method as set forth in claim 2 wherein said particulate slag is oxidized at a temperature between the range of 1000°C–1100°C.

4. The method as set forth in claim 3 wherein said slag is oxidized at 1000°C–1100°C for periods up to about three hours.

5. The method as set forth in claim 1 wherein during the oxidation step the molybdenum is oxidized to its highest oxidation state and forms a molybdate with calcium.

6. The method as set forth in claim 1 wherein during the oxidation step the molybdenum is oxidized to its highest oxidation state and forms a molybdate with magnesium.

7. The method as set forth in claim 1 wherein during the leaching step the oxidized particles of step B are contacted with a reagent that reacts with the particles to form water-soluble molybdate salts.

8. The method as set forth in claim 7 wherein during the leaching step the oxidized particles of step B are contacted with an acid salt and wherein the acid ion concentration is greater than 0.1N.

9. The method as set forth in claim 8 wherein during the leaching step the acid ion concentration is greater than 0.5.

10. The method as set forth in claim 7 wherein the oxidized particles of step B are contacted with a reagent selected from the group consisting of sodium hydroxide, potassium hydroxide, sodium carbonate, sodium bicarbonate, potassium carbonate, ammonium carbonate, ammonium bicarbonate and mixtures thereof.

11. The method as set forth in claim 10 wherein the reagent selected is a hydroxide and the pH of the leach solution is greater than 12.

12. The method as set forth in claim 11 wherein the pH is greater than 13.

13. The method as set forth in claim 10 wherein the reagent is a basic salt and the basic metal ion concentration is greater than 0.01N.

14. The method as set forth in claim 13 wherein the basic metal ion concentration is greater than 0.5N.

15. The method as set forth in claim 1 wherein during the leaching step the oxidized particles of step B are contacted with a reagent selected from the group consisting of sulfuric acid, sodium sulfate, potassium sulfate and potassium acid sulfate.

16. The method as set forth in claim 1 wherein during the leaching step the oxidized particles of step B are contacted with an acid and wherein the pH is maintained at less than 3.

17. The method as set forth in claim 16 wherein during the leaching step the pH is maintained at less than 1.

* * * * *